Jan. 17, 1939.  J. E. PADGETT  2,144,298
AUTOMATIC POWER TRANSMITTING MECHANISM
Filed May 6, 1933  4 Sheets-Sheet 3

Patented Jan. 17, 1939

2,144,298

UNITED STATES PATENT OFFICE 2,144,298

AUTOMATIC POWER TRANSMITTING MECHANISM

Joseph E. Padgett, Toledo, Ohio, assignor to Automatic Drive & Transmission Company, Gloucester City, N. J., a corporation of New Jersey Application May 6, 1933, Serial No. 669,766

13 Claims. (Cl. 192—68)

The present invention relates to mechanisms for automatically transmitting power from a driving shaft to a driven shaft when the respective speeds of the shafts are properly correlated for efficient operation.

More particularly, the present invention relates to automatic clutch mechanisms, and although they possess operating characteristics and structural features that render them especially useful in automotive or like drives, they may be employed in a wide variety of power transmitting drives. The present invention also possesses many features that may be advantageously employed in manually operable clutch mechanisms and therefore the following description and claims are intended to embrace manual as well as automatic clutch mechanisms.

The use of friction clutches in the drive mechanisms of motor vehicles is universal, and in fact many of them are of the single plate type, i. e., friction clutches wherein a driven disc or plate is disposed between, and frictionally cooperates with a pair of driving members. These clutches have proved to be fairly efficient and durable in practice, and in view of their widespread adoption, they undoubtedly represent a great improvement over the friction clutches that existed before their development, but when certain phases of their operating characteristics are considered, they leave much to be desired. More specifically, the prior friction clutches seem to function fairly well and pick up the load with a satisfactory degree of smoothness when they are new, but after they have been in use after a short time they develop "chattering" or "grabbing" properties. This chattering or grabbing action is evidenced most, or is more pronounced when the clutch plates are disposed in light driving engagement, as in initially picking up a load from a standstill. During such chattering operation, the driven member is alternately or intermittently advanced, and a torque of widely fluctuating magnitude is transmitted to the drive mechanism, with the result that not only noisy and highly undesirable jerky acceleration is imparted to the motor vehicle or other load, but stresses are set up in the drive mechanism that frequently causes failure thereof, and the clutch facings are often prematurely worn away as the result of such chattering operation.

Vast amounts of time have been spent by workers in this field, and large sums of money have been expended looking toward ascertainment of the cause of, and the elimination of, this trouble. So far as can be determined by investigation, the trouble has been traced, in part, to so-called "high spots" on the facings, as well as the clutch plates, which cause localized high pressure areas to develop between the plates when they are brought into frictional engagement, with consequent objectionable chattering. This is more pronounced when the plates are initially brought into comparatively light engagement, and under these conditions, the high spots on the driving plates apparently alternately "interlock" with, and disengage themselves from the high spots on the driven members when the load is being picked up, with the result that an extremely rough and uneven acceleration of the driven member is produced by such operation.

In an effort to remedy the trouble in light of this discovery, clutch plates were designed that were comparatively massive, so as to avoid distortion under the pressure of operation, and they were accurately machined and polished so as to present an absolutely plane engaged face, and the facings carried by the driven disc were likewise formed to provide plane faces. These mechanisms also proved to operate fairly well when new, but when in use a sort time, they developed chattering and grabbing operating characteristics, and upon being disassembled, it was discovered that the plates had become distorted, under the heat developed therein during operation thereof, and no longer presented plane faces, and the facings were likewise worn away unevenly. Therefore, the plates and facings were restored to their "high spotted" condition, and this approach to a solution of the problem was abandoned for this reason.

The problem was then attempted to be solved by designing the mechanism so that the clutch plates would be brought into partial surface engagement during the initial part of the engaging operation, and into full surface engagement when full driving pressures were applied to force them together. These mechanisms have recently been put into limited use in motor vehicle drives and they consist of a conventional friction clutch that is provided with a so-called "cushion disc". The "cushion disc" is a driven clutch disc that has portions thereof sprung out of the plane of the disc. The sprung portions, or fingers, as well as the plane portions of the disc, are provided with facings, and when the plates are brought into engagement with the facings, those carried by the spring fingers are frictionally contacted first, and in view of their resilient nature, they may follow any irregularities in the plates, and the generation of localized high pressure areas is thereby avoided in part. When the plates are brought into full driving engagement, the spring fingers lie in the plane of the driven disc and the auxiliary and main facings are disposed in driving engagement with the plates.

These mechanisms, it is true, when they are accurately designed, and are new, give a performance that is far superior to that of clutches wherein the driven member carries facings whose surfaces are plane, but their desirable operating characteristics are comparatively rapidly lost after they have been in use, and this is especially true when they are subjected to abuse. One of the major factors that causes these mechanisms to fail to stand up in practice resides in the fact that the temper of the spring fingers provided on the driven disc is drawn or seriously modified under the fairly high temperatures developed in the mechanism during normal operation, with the result that they take a permanent "set", and lie substantially in the plane of the driven disc after a short period of use. Failure of these mechanisms is also brought about for the further reason that the auxiliary facings, when frictionally engaged by the plates, contact the latter at a relatively great angle, with the result that the auxiliary facings are worn away unevenly, and after a relatively short period of use, their engaging faces lie substantially in the plane of the main facings, and their resilient, or "cushioned" action is thereby lost.

All of the materials employed for clutch facings, without exception, are of such character, that during clutch operation minute particles, in the form of dust, are freed from the facings, and this material, rolling or sliding between the engaging surfaces of the facings and the clutch plates when the clutch is "slipping" or picking up the load, exerts an abrading action on the facings as well as the plates, with the result that the facing material is prematurely worn away and the clutch plates are frequently scored or pitted. The dust disposed between the engaging faces not only precludes the smooth transmission of power when the clutch is picking up the load, but in some instances the dust also builds up and produces "high spots", which further impairs smooth action in the manner previously explained.

A further serious defect inherent in the friction clutches now in general use resides in the fact that the clutch plates are frequently distorted when they are subjected to the temperatures developed in normal clutch operation, with the result that only a portion of the area of the plates is brought into engagement with the facings, and premature wear of the latter takes place and chattering clutch operation obtained.

Prior friction clutches do not effect proper cooling of the clutch facings, with the result that when the clutches are picking up the load, especially when starting a vehicle on a steep grade, high temperatures develop in the facings, as well as in the driven disc, and the facing material is not only prematurely worn by a crumbling action that takes place, but the coefficient of friction of the latter is often so seriously modified that extremely defective clutch operation is obtained.

In the friction clutches that have been heretofore proposed, the pressure or clutch plates have been keyed to the flywheels or other driving members in such manner, that when the clutch is initially engaged and the driven disc picked up, the drag or torque reaction of the latter sets up frictional forces in the keying means, so that further axial movement of the clutch plate into engagement with the facings carried by the driven disc occurs in an uneven and uncertain manner, with the result that clutch grabs and chatters and a torque of fluctuating magnitude is transmitted to the load.

It is accordingly a primary object of the present invention to provide friction clutches of the plate type that will smoothly transmit power that uniformly increases in magnitude, from a driving to a driven shaft with a slipping drive as the plates are brought into engagement with increasing pressures, whose smooth operating characteristics are retained throughout their lives, that are simple in design, that are durable, even under severe operating conditions; and yet that may be constructed by low cost, quantity production methods.

It is a further major object of my invention to devise friction clutches of the plate type that will smoothly transmit a torque of uniformly and comparatively gradually increasing magnitude as the plates are brought into driving engagement with increasing pressures without chattering or grabbing, and that may be subjected to prolonged and severe slippage without damaging them nor in any way impairing or harmfully modifying their smooth operating characteristics.

Another object of my invention resides in the provision, in friction clutches of the plate type, of a novel pressure plate that is so designed that it may be subjected to widely different operating temperatures without undergoing harmful distortion or warpage.

Another object of my invention is to provide friction clutch mechanisms that produce soft or yielding clutch engagement, and yet that bring the engaging faces into full surface contact during all phases of their engaging operation, whereby the facings wear evenly and have a long life, even under severe operating conditions, and that are so designed that the highly desirable operating characteristics of the mechanisms are retained throughout their lives.

It is a further object of the present invention to provide friction clutches having friction plate organizations that are so designed, that when pressure is applied to the plates, pressure initially builds up symmetrically between portions of their inter-engaging areas, whereby the harmful effect of scattered high spots in the engaging surfaces is minimized.

My invention further aims to provide novel friction clutch mechanisms of the plate type, that are so designed that their operating characteristics are substantially unaffected by the presence of "high spots" on the plates or other slight inaccuracies of the parts resulting from their manufacture by low cost, quantity production methods.

Another object of the present invention is to provide friction clutches of the plate type; with means for removing the particles, that are freed from the facings, from their disposition between the plates and facings, thereby keeping the relatively slipping surfaces clean at all times and insuring the smooth transmission of power under slipping drive conditions, and at the same time precluding the possibility of the freed particles from exerting an abrading action on the slipping surfaces.

It is still a further object of my invention to provide friction clutch mechanisms of the plate type, with means for effectively cooling their parts during all phases of their operation, especially during the time they are slipping and picking up the load and heat generation is rapid.

Another object of the present invention resides in the provision, in friction clutches of the plate type, of means for causing cooling, dust-removing, air currents to flow over the surfaces of the facings during all phases of operation of the mechanisms, thereby maintaining the facings clean and at a reasonably low temperature, even when excessive slippage of the mechanism is taking place.

Another object of the present invention is to provide friction clutches of the type wherein pressure plates are mounted for axial movement into and out of engagement with driven members, with novel means for keying the pressure plates in such manner that resistance to movement thereof is small, even when a load is imposed thereon as the result of picking up the driven members.

The present invention further aims to provide friction clutches having driving plates that are so designed and associated with the clutch parts, that when the load is imposed upon them as the result of their engagement with their cooperating driven plates, the resulting torque reaction tends to move the plates into more firm engagement, thereby augmenting the action of the mechanism employed to force the plates into frictional engagement and providing a self-energizing effect.

A further object of my invention is to devise automatic clutch mechanisms that will establish a driving connection between driving and driven shafts when the respective speeds of the latter are correlated in a predetermined manner, that are simple in design and durable, and yet that may be produced by low cost, quantity production methods.

A still further object of my invention is to devise novel automatic or speed responsive clutch mechanisms that are provided with mechanism for limiting the action of the speed-responsive mechanism in such manner that the pressure built up between the plates is limited to a definite predetermined magnitude, and the mechanism is stable and dynamically balanced at all speeds, and the limiting mechanism is so designed, that the stresses set up in the parts, as the result of the restraining action of the limiting mechanism, are of low magnitude.

A further object of my invention is to devise, for use in automatic clutch mechanisms of the type wherein speed-responsive mechanism reacts against a movable reaction member to force the plates into frictional engagement, novel means for limiting the action of the speed-responsive mechanism, that is independent of the reaction member, and yet that effectively prevents the mechanism from manifesting declutching tendencies at high speeds.

It is a further object to devise, for use in friction clutches of the plate type, novel speed-responsive mechanisms for forcing the plates into frictional engagement, that are simple in design, operate with a minimum of friction at all times, and yet that may be manufactured by low cost, quantity production methods.

Another object of my invention is to devise a novel mechanism for establishing and maintaining accurate static and dynamic balance of the axially movable members of a friction clutch mechanism.

My novel clutch mechanisms, whether they be embodied in the manually or automatically operable form, are intended to be embraced by one, or several, or all of the above-mentioned objects.

Further objects of the present invention will become apparent as the specification proceeds in connection with the annexed drawings, and from the appended claims.

In the drawings:

Figure 14 is a longitudinal sectional view of a further modification of my invention and illustrates the positions taken by the parts when the clutch mechanism is automatically disengaged.

Figure 15 is a view taken substantially on the line XV—XV of Figure 14, with certain parts in section and certain other parts broken away to more clearly illustrate the structure involved.

Figure 16 is a fragmental sectional view illustrating the parts of the mechanism shown in Figure 14 in the positions they assume when the clutch is automatically engaged.

Figure 17 is a view looking at the edge of the automatic plate employed in the mechanism shown in Figure 14, and the plate is broken away to illustrate the eccentric groove formed therein.

Figure 17A is a fragmental sectional view illustrating a modified form of lever and plate organization that may be employed in any of the clutch mechanisms previously referred to.

Referring to the drawings, wherein like reference characters refer to like parts throughout the several views thereof, my automatic clutch mechanism is preferably enclosed in a clutch housing that is illustrated as broken away and is designated generally by the reference character 1.

A driving shaft 3 is adapted to have rotational efforts applied to it by a suitable prime mover in any desired manner, and in the present instance it is shown as constituting the crank shaft of an internal combustion engine. The end of the shaft 3 is secured to a flywheel 4 by bolts 5, or in any other suitable manner. Bolts 5 extend through aligned apertures in the flywheel and the flange provided on the end of shaft 3, and have nuts turned thereon.

Shaft 3 is further provided with a bore 6 in which is carried a bearing assembly 7 for supporting the reduced end 8 of a clutch shaft 9. The rear end of shaft 9 is adapted to be journaled in a bearing assembly (not shown) that is preferably located in recess 10 in housing 1.

A hub 11 is splined upon shaft 9 and is provided with a flange 12. Operatively secured to flange 12, by means of rivets or the like, is a vibration dampener designated generally by reference character 13 which provides a resilient driving connection between hub 11 and a driven disc 14. This vibration dampener is employed to dampen out any torsional vibrations that may be set up in the crank shaft of the engine, and in view of the fact that it forms no part of the present invention, it will not be further described.

Facings 15 and 16 are secured to opposite sides of disk 14 near its periphery, and they may consist of any material that has the required characteristics to give the correct frictional gripping force, and at the same time has wearing qualities adapting it for this purpose. I prefer, however, to use the types of material which in practice have given very satisfactory results in automatic slipping drive and clutch mechanisms of the "Powerflo" type. Frictional facings 15 and 16 may be secured to disk 14 in any suitable manner, as for instance by rivets or the like, and they, along with disk 14, will be hereinafter referred to as the driven member.

Facing 15, secured to disk 14, cooperates with the flat driving face of flywheel 4 and is adapted to be frictionally driven thereby. Facing 16, cooperates with a plate 17, which will be hereinafter termed the automatic plate for the reason that it is automatically actuated and is adapted to engage and clamp the driven member between it and the flat face of the flywheel. Plate 17 is of substantial thickness so that it may possess a sufficient degree of rigidity to prevent undesirable distortion and warpage thereof under the pressures and temperatures that it is subjected to during operation of the mechanism.

Figures 4, 6, 8:
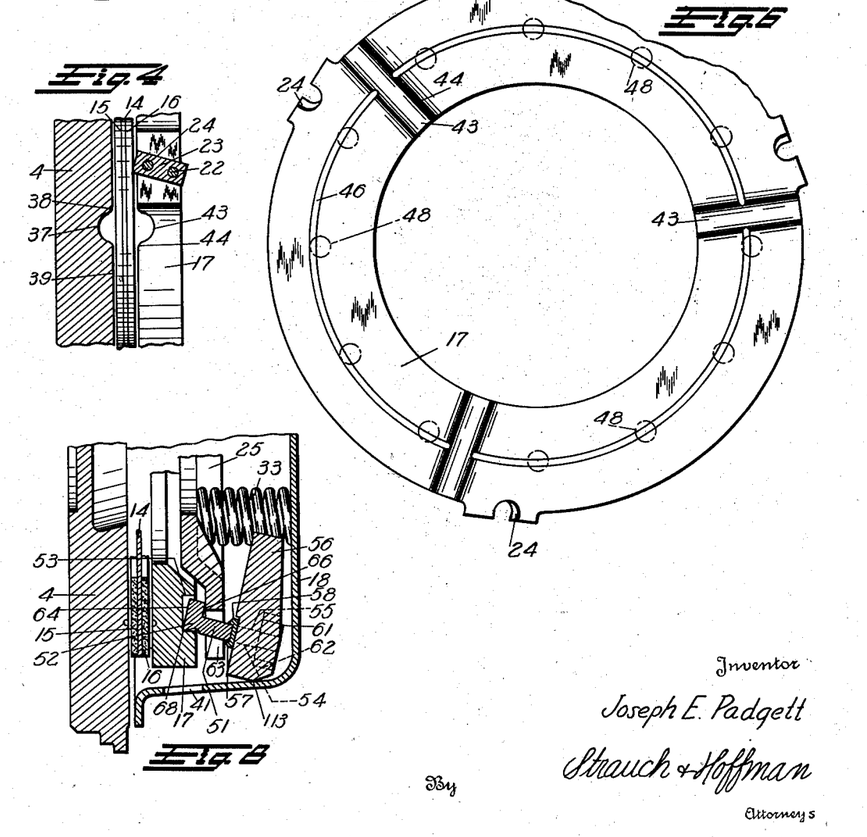
Figure 4 is a sectional view taken on the line IV—IV of Figure 5.
Figure 6 is an elevational view of the pressure or automatic plate of the mechanism illustrated in Figure 1, with the positions taken by the countersinks in the facings indicated with broken lines.
Figure 8 is a view similar to Figure 7, but shows the plates in manually disengaged condition.

A cover member 18 is secured to the flywheel by means of cap screws 19. Before cover 18 is secured to the flywheel, however, spacer members 21 are preferably inserted between their cooperating surfaces to space the cover from the flywheel for a purpose that will presently appear. Secured to the inner walls of cover 18, by means of rivets 22 or the like, are three symmetrically arranged lug or key members 23. Key members 23 are received in, and cooperate with the walls of recesses 24 formed in automatic plate 17 to establish a driving connection between flywheel 4 and the automatic plate. Referring more particularly to Figure 4 of the drawings, members 23 and recesses 24 are seen to be disposed at such an angle that when the flywheel and cover 18 rotate in a clockwise direction, as viewed from the left-hand side of Figure 1, and rotation of automatic plate 17 is resisted, as by a load or the like, members 23 exert a camming or wedging action upon the walls of recesses 24 and tend to produce movement of automatic plate 17 toward the flywheel and into frictional engagement with the driven member, and this operation will be amplified as the specification proceeds.

Figures 5, 7:
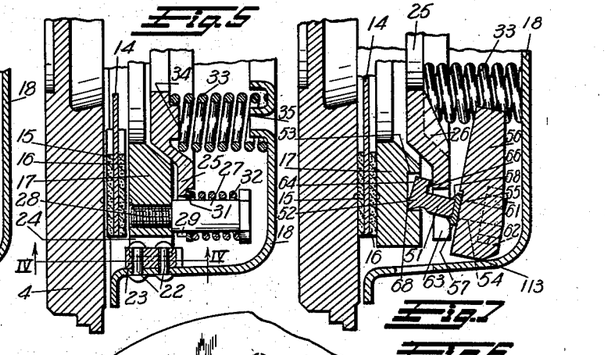
Figure 5 is a fragmental sectional view taken on the line V—V of Figure 2.
Figure 7 is a fragmental sectional view of the mechanism illustrated in Figure 1, showing one of the centrifugally operable weights in its outermost position, and the plates engaged.
Figure 9:
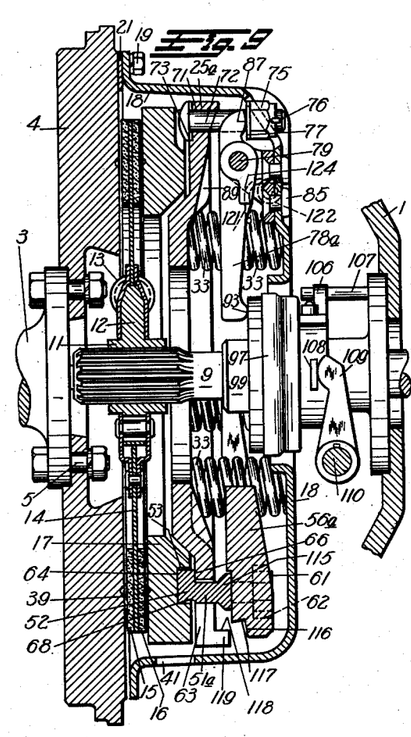
Figure 9 is a view similar to Figure 1, and illustrates another clutch mechanism forming part of the present invention.
Figure 10:
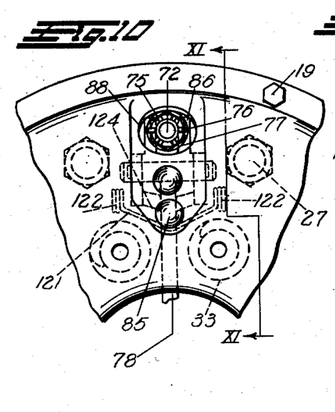
Figure 10 is a fragmental view illustrating one of the lever assemblies of the mechanism shown in Figure 9.
Figure 11:
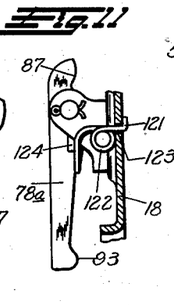
Figure 11 is a sectional view taken substantially on line XI—XI of Figure 10, looking in the direction of the arrows.

Disposed parallel to plate 17 is a plate 25, and it will be hereinafter referred to as reaction plate 25, because it takes the reaction of the speed-responsive mechanism in a manner to be presently described. Reaction plate 25 is provided with stiffening webs 26, and is driven by automatic plate 17 through the medium of a plurality of cap screws 27. Referring particularly to Figure 5, each cap screw 27 is provided with a reduced end 28 that is threaded into automatic plate 17, and the thread employed is preferably of the Dordelet or other self-locking type so as to prevent the cap screws from working loose in operation. Cap screws 27 extend through, and lie in slidable driving engagement with the walls of recesses 29 formed in reaction plate 25, and are encircled by washers 31 and compression springs 32. Springs 32 act against the heads of screws 27 and react against plate 25, to thereby urge the automatic and reaction plates toward each other at all times, and they will be hereinafter referred to as holdback springs. The holdback spring assemblies are preferably symmetrically disposed in pairs about the periphery of the plates and in the present instance six are employed, but it is to be understood that more or less than six properly designed holdback spring assemblies may be used if desired without in any way departing from the spirit of my invention. The holdback assemblies accordingly establish a driving connection between the automatic and reaction plates, and, at the same time, resiliently urge the latter toward each other.

Reaction plate 25 is normally urged toward the flywheel by a plurality of compression springs 33, that are retained in position against plate 25 by means of bosses 34 formed on the latter. Springs 33 react against the surface of cover 18, and are centered thereon by means of pressed out portions 35 formed in cover 18. Springs 33 are preferably six in number and are disposed in substantially common radii with the holdback assemblies. Reaction plate 25, however, is normally held in the position shown in Figure 1, when the driving shaft is operating at or below the idling speed of the engine or other prime mover, by means of a throwout mechanism that will presently be described.

Figure 2:
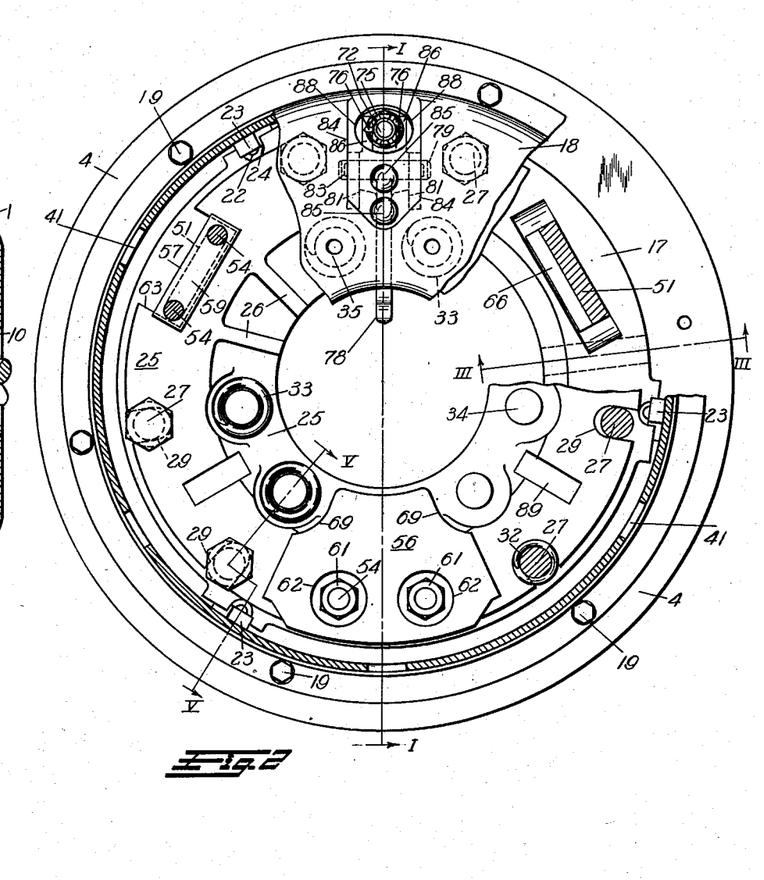
Figure 2 is a sectional view taken substantially on the line II—II of Figure 1, illustrating some of the parts broken away, and other parts removed in order to more clearly illustrate the structure involved.
Figure 3:
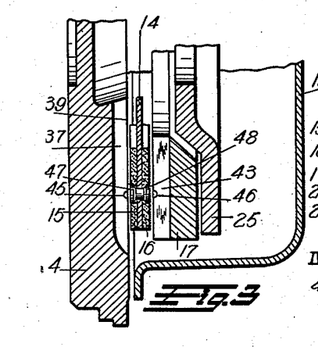
Figure 3 is a fragmental sectional view taken on the line III—III of Figure 2, looking in the direction of the arrows.

Before proceeding to the description of the actuating mechanism for the automatic plate, the design of the surfaces that engage facings 15 and 16 will be described. Referring more particularly to Figures 2, 3 and 4, flywheel 4 is provided with preferably three radially extending, symmetrically arranged grooves or recesses 37. Grooves 37 may be formed in flywheel 4 in any desired manner as by milling or the like, and are designed to provide surfaces 38 that gradually merge into the plane of the driving face 39 of the flywheel.

When facing 15 is disposed in slipping engagement with the flywheel, the material freed from the facing 15, in the form of dust, is rolled or carried into grooves 37. Rotation of the flywheel causes air currents to be drawn into grooves 37 from the central region of the mechanism. The cooling and dust-removing air may be admitted through a suitable opening or openings (not shown). After traversing grooves 37, the air currents are exhausted from the mechanism through apertures 41 provided in cover 18, and through the spaces between the cover and the flywheel. These air currents sweep over the entire surface of facing 15 when the latter is slipping with respect to the flywheel, and not only effect efficient cooling of the flywheel and facing 15, but carry away any material that may be freed from facing 15 as the result of the slipping operation. This organization therefore keeps the parts at a reasonably low temperature and maintains the engaging surfaces clean and smooth at all times, thereby insuring smooth power transmission, even under severe operating conditions.

Automatic plate 17 is likewise provided with three grooves 43, having curved portions 44. Grooves 43 are preferably axially aligned with grooves 37 formed in the flywheel, and cooperate with facing 16, insofar as cooling and dust removal is concerned, in precisely the same manner as that described in connection with grooves 37 and facing 15.

Grooves 43 also perform the further highly important function of enabling the automatic plate to expand or contract in response to temperature changes without undergoing sufficient distortion to warp or distort its engaging face.

Although plate 17 is comparatively massive, grooves 43 are preferably of such depth to divide the automatic plate into three, semi-flexibly interconnected segments, and the driving assemblies are so disposed (Figures 2 and 6) that they drive plate 17 in such manner that they draw or pull the segments in a circular path.

Flywheel 4 and plate 17 are provided with circular grooves 45 and 46, respectively, that are eccentric with respect to the axis of the mechanism, and are so designed to cooperate with the countersinks 47 and 48 formed in facings 15 and 16, respectively, to prevent noise developing as the latter slip past the grooves formed in the flywheel and the automatic plate. The edges of grooves 45 and 46 are rounded and polished, and, as seen in Figure 6, groove 46 is eccentric to the countersinks 48 (the positions that the latter would take being indicated by broken lines), and yet defines a circular area that is co-extensive with the area defined by the width of the countersinks, so that it communicates with countersinks 48 at all times. Groove 45, formed in the flywheel, cooperates with countersinks 47 in a similar manner, and they are preferably eccentrically formed so that they will not produce high ridges in facings 15 and 16 when wear of the latter takes place.

The automatic and reaction plates may be actuated away from each other by any suitable speed-responsive mechanism, to produce clutch engagement, but in the present embodiment of my invention, it preferably takes the form of centrifugally operable mechanism. Preferably three weight levers 51, having integrally formed heads 52, are symmetrically arranged between the pairs of pressure springs 33, and have their heads 52 received in rectangular recesses 53 formed in automatic plate 17. Recesses 53 are located in the trailing ends of the segments of the automatic plate defined by grooves 43 for a purpose that will more fully appear hereinafter.

Each lever 51 is provided with a pair of threaded portions 54, which are received in a pair of apertures 55 located in a weight element 56. A reinforcing element 57 is disposed between weight 56 and lever 51, and is provided with portions 58 that embrace the sides of lever 51, and a flat surface 59 that is adapted to abut the surface of weight 56. Weight 56 and member 57 are held in place on lever 51 by means of nuts 61, turned on portions 54, and seating in countersinks 62 formed in weight 56. When nuts 61 are turned home, the parts are rigidly clamped in assembled condition and portions 58 of member 57 cooperate with lever 51 to prevent angular movement of the latter with respect to weight 56. Although I prefer to secure levers 51 to weights 56 in the manner just described, it is to be understood that the weights may be integrally formed with the levers if desired, without departing from the spirit of my invention.

Levers 51 are of substantial width and extend through recesses 63 formed in reaction plate 25. Heads 52 are provided with flat faces 64 that normally abut the bottoms of recesses 53 when the driving shaft is operating at, or below idling speed, and by the term "idling speed", I mean the particular desired automatic uncoupling or disengaging speed of the driven shaft, and if an internal combustion engine is employed as the prime mover, the idling speed will lie in the neighborhood of four hundred to five hundred revolutions per minute.

Heads 52 are also provided with reaction faces 66 which abut the face of reaction plate 25 at all times, and are designed for fulcruming engagement therewith during operation of the weights. The surface of plate 25 that cooperates with faces 66 of weight-heads 52 is preferably ground and polished so that relative sliding movement thereof may occur with a minimum of friction.

Heads 52 have their outer sides relieved to provide knife-like edges 68 which are adapted to rock or pivot in the dihedral angles defined by the bottom and outer faces of recesses 53 formed in automatic plate 17. The relieving operation enables a good knife edge 68 to be formed on each weight head, and allows pivotal movement thereof without interference from the outer side walls of recesses 53. However, it is to be understood that unrelieved weights may be employed in recesses that are suitably designed so as to have relieved outer side walls, if desired. It is also to be understood that, instead of providing individual recesses 53 for cooperation with the weight heads, a single annular groove, as shown in my co-pending application, Serial No. 660,179, filed March 9, 1933, may be formed in automatic plate 17 if desired, without departing from the spirit of the present invention.

Recesses 53 are formed in automatic plate 17 in any desired manner, as for instance by a milling cutter or the like, and weight heads 52 are prevented from moving longitudinally within the recesses so formed, by the engagement of the walls of recesses 63 formed in plate 25, with the sides of levers 51. Heads 52 fit rather snugly between the inner and outer side walls of recesses 53 so that they are restrained from shifting bodily inwardly or outwardly, thereby insuring dynamic balance of the mechanism at all times. Knife edges 68 are adapted to cooperate with the flat bottom faces of recesses 53 and thereby act in line contact upon plate 17 for a substantial distance across the face thereof, whereby uniform distribution of pressure over a substantial area of the segments is effected. Each weight 56 is further provided with recesses 69 which allow free operation thereof without interference from bolts 27 and springs 33.

The seats formed by the bottom and outer faces or walls of recesses 53 constitute bearing recesses in which edges 68 of weight heads 52 are adapted to fulcrum, and although I prefer to employ this arrangement, it is to be understood that the relation of the parts may be reversed, and the bearing recesses formed in weight heads 52, and the knife edges formed on plate 17, or a member or members secured thereto, if desired, without departing from the spirit of the present invention.

The mass of weights 56, and the number of weights and lever assemblies employed in a particular installation, is determined by a consideration of the required pressure that they must transmit under the desired speed conditions to urge the clutch plates into final non-slipping engagement. In the automatic drive clutch mechanism shown, three equally spaced weight assemblies are preferably employed.

Figure 1:
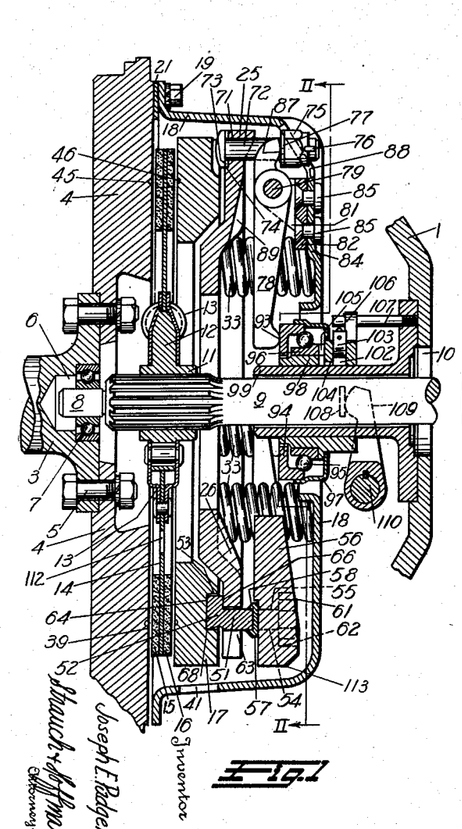
Figure 1 is a longitudinal sectional view of an automatic clutch mechanism forming part of my invention, and is taken substantially on the line I—I of Figure 2, looking in the direction of the arrows.

When shaft 3 is stationary, or is operating at, or below, a speed corresponding substantially to the idling speed of the prime mover employed to drive it, the parts assume the positions in which they are shown in Figure 1. Heads 52 of levers 51 are clamped between plates 17 and 25, under the influence of springs 33 acting against plate 25 and cap screws 27, and plate 25 is held in the position shown, against the action of springs 31, by means of a throwout mechanism that will now be described.

Extending through apertures 71 formed in plate 25, and preferably symmetrically disposed between the weight assemblies, are a plurality of bolts 72. The heads of bolts 72 are provided with blade-like portions 73 which seat in recesses 74 located in plate 25 and serve to hold bolts 72 against rotation. Castle nuts 75 are threaded on bolts 72 and are adapted to be held in adjusted positions thereon by means of cotter pins 76. Hardened washers 77 are disposed on bolts 72 and cooperate with clutch fingers 78 to produce movement of plate 25 away from the flywheel. Fingers 78 are pivoted on pins 79 secured in spaced ears 81 formed on bracket members 82. Pins 79 are preferably held in position in ears 81 by means of cotter pins 83, and brackets 82 are secured against pressed in portions 84 by means of rivets 85 or the like. Fingers 78 are provided with bifurcated portions 86, and the latter have curved faces 87, that cooperate with washers 77 in a manner to be presently described.

Bolts 72 and nuts 75 are adapted to partially extend through apertures 88 formed in cover 18, and the apertures are preferably of a size sufficient to allow a wrench or the like to be applied to nuts 75 for clutch adjustment purposes.

Movement of the inner ends of fingers 78 to the left, in Figure 1, through the intermediary of bolts 72, causes movement of plate 25 away from the flywheel against the action of springs 33. Movement of the reaction plate produces similar movement of plate 17 because the holdback assemblies hold the two plates in unitary relationship at all times. Recesses 89 are formed in plate 25 to allow free oscillation of fingers 78. Fingers 78 are adapted to be actuated in this manner by means of a throwout assembly that will now be described.

Cooperating with curved faces 93 formed on fingers 78 is the flat face of a ball race 94, which cooperates with anti-friction balls 95 disposed between race 94 and a cooperating ball race 96. Ball races 94 and 96 are held in assembled relation with respect to each other by means of a combined retainer and reservoir defining member 97.

Ball race 96 is rigidly mounted upon a sleeve 98 which is slidably mounted upon a hollow supporting member 99. The latter is preferably integrally formed with housing 1 and is accurately machined to be disposed in axial alignment with the clutch mechanism and prime mover shaft 3 when the clutch is assembled, and is designed to provide a close sliding fit with sleeve 98. Member 99 is preferably spaced substantially from, and is independent of, shaft 9. Sleeve 98 is provided with a tapped bore 102 into which a grease fitting 103 of well known construction is screwed. Bore 102 communicates with an axially extending passage 104 formed in sleeve 98 so that lubricant introduced through bore 102 provides lubrication for axial movements of sleeve 98 and also provides lubrication for the bearing assembly through a passage 105 communicating with passage 104 and reservoir defining member 97 associated with the bearing assembly.

Sleeve 98 is prevented from rotating about support 99 by means of an apertured lug 106 formed on sleeve 98. A stud 107 is slidably received in lug 106 and is threaded into an aperture in housing 1. Formed on opposite sides of sleeve 98 are lugs 108 which cooperate with throwout fingers 109 rigidly carried by a throwout shaft 110. Shaft 110 is preferably journaled in, and extends outwardly of clutch housing 1 and carries on the end thereof a clutch pedal, (not shown) which is secured against rotation thereon.

Although I have disclosed a specific throwout assembly in connection with my invention, it is to be understood that any suitable throwout mechanism having a face that is substantially normal to the clutch axis for cooperating with the inner ends of fingers 78 may be employed if desired, and a thoroughly practical mechanism obtained.

Before proceeding to further structure, it should be observed that the greater length of driven shaft 9 is clear of supporting sleeve 99, the latter being stationarily mounted in the clutch housing or casing. Therefore, substantial eccentric, or angular misalignment of driving shaft 3 and driven shaft 9 can have no effect whatever upon the cooperation of the throwout bearing assembly and its cooperation with fingers 78. Moreover, since driving shaft 3, in the present instance, is the crank shaft of the engine, and the bearing face of support 99 is carefully machined to lie exactly parallel to driving shaft 3, their permanent alignment is assured and the throwout bearing assembly, providing nuts 75 are properly adjusted, causes plate 17 to be disposed in proper angular relation to the flywheel face at all times, regardless of whether the clutch is engaged or disengaged. Moreover, fingers 78 will be held tight at all times, regardless of manufacturing inaccuracies, or inaccuracies that arise due to wear, by their three-point support on the face of the throwout bearing assembly while the throwout bearing is positively maintained in proper alignment by virtue of the stationary guiding means formed on the clutch housing, providing smooth clutch action with minimum pedal operating pressures at all times in a low cost construction requiring a minimum of manufacturing accuracy.

It is to also be understood that light springs of suitable design may be associated with fingers 78 to urge their inner ends toward the throwout bearing at all times for antirattling purposes, if desired, without in any way departing from the spirit of my invention.

Clutch pedal shaft 110 is preferably adjustably held by a suitable mechanism in such a position that the throwout bearing assembly will hold the parts in the positions in which they are shown in Figure 1 when driving shaft 3 is stationary or is operating at, or below, a predetermined idling speed of the prime mover utilized therewith. Under these conditions, a clearance exists between the plates and there is accordingly no driving connection between shafts 3 and 9. Any suitable latch mechanism may be associated with shaft 110 or the clutch pedal for holding shaft 110 in this position, but I preferably employ the type of clutch pedal latch mechanism disclosed in my co-pending application, Serial Number 660,179, filed March 9, 1933, and which may be referred to for a full disclosure thereof. The throwout bearing assembly is shown in Figure 1 in what is termed its "automatic" position, and is so termed because it is preferably disposed in this position when the clutch mechanism functions, or is being employed as an automatic or speed-responsive clutch.

The clutch pedal may be depressed to move the throwout bearing assembly to the left of the position shown in Figure 1, for manually declutching the mechanism in a manner to be hereinafter pointed out, and the parts of the latch mechanism are so designed to allow this movement of the pedal without interference.

The latch mechanism may be operated to allow the clutch pedal to retract and permit the throwout bearing to move to the right of the position illustrated in Figure 1, into what is termed its manually engaged position.

With the throwout mechanism disposed in automatic position, the speed-responsive, or automatic, operation of the mechanism is as follows:

*Automatic operation*

As driving shaft 3, and flywheel 4 are accelerated, weights 56 gradually swing or rock outwardly about their knife-edges 68 as axes in response to centrifugal force. As this occurs, reaction faces 66 of heads 52 fulcrum and slide on the face of plate 25 and knife edges 68, by virtue of their engagement and fulcruming action upon the flat bottom surfaces of recesses 53 located in the trailing end of the segments of automatic plate 17, force automatic plate 17 away from reaction plate 25 against the action of holdback springs 32, and into engagement with facing 16 of disk 14, on a three-point support, thus causing disk 14 to move axially and bring the facing 15 thereof into contact with the flywheel face.

Movement of automatic 17 away from reaction member 25 is opposed by holdback springs 32, and therefore weights 56 are held under control. Holdback springs 32, therefore, in addition to predetermining the speed of the mechanism at which automatic engaging operation is initiated, exert a steadying influence upon the clutch parts.

The engaging surfaces of facing 16 and automatic plate 17 are preferably plane, so that when they are brought into engagement by the speed-responsive mechanism, they lie in full surface contact, and this is preferably likewise true of the engaging surfaces of facing 15 and the flywheel.

After the driven member is thus frictionally clamped or gripped between automatic plate 17 and flywheel 4, movement of plate 17 is substantially arrested, and further rocking movement of weights 56, in response to a further increase in centrifugal force, causes faces 66 of heads 52 to force reaction plate 25 away from the flywheel against the action of springs 33. Movement of plate 25 in this manner causes pressure to slowly build up in springs 33, and a corresponding pressure is built up between the edges 68 of heads 52, and the bottoms of the recesses in automatic plate 17.

In view of the fact that plate 17 is divided into a plurality of semi-flexibly connected segments, and the forces exerted by the weight heads is applied to the trailing ends of the segments, the latter may undergo a very slight circumferential tilting action when the pressure is initially building up. The engaging pressures between the segments of automatic plate 17 and facing 16 is thereby initially concentrated in the trailing ends of the segments, and although the engagement pressure is not uniform in a circumferential direction, the pressure, taken in a radial direction on any particular radius, is nevertheless uniform, with the result that extremely smooth clutch action is obtained and facing 16 is worn away evenly in operation. Concentration of initial engaging pressures in the trailing ends of the segments increases the unit pressure between the frictionally slipping surfaces and superior clutch action is apparently secured because of the smoothing action that the plate exerts upon facing 16 during this operation. The grooves formed in the automatic plate enable the latter to freely expand in response to temperature increases without setting up internal stresses that might cause its frictional surface to be warped or distorted into other than a plane configuration.

It is observed that fulcrums 68 of weight heads 52 are disposed approximately midway of the outer and inner peripheries of the segments of plate 17, and act in line contact therewith for a substantial distance across their faces, applying substantially uniformly distributed pressures opposite the centers of their engaging areas, thereby minimizing warping and distorting tendencies of the segments under the pressures and temperatures to which they are subjected during operation.

During the initial portion of the pressure build up operation, a torque of low and slowly increasing magnitude is smoothly transmitted from shaft 3 to shaft 9. The torque reaction set up by the load driven by the mechanism causes plate 17, to react against key, or lug, members 23. Members 23, and recesses 24, are preferably so designed, that the camming or self-engaging action resulting from the reaction of members 23 against the walls of recesses 24, when the load is being picked up, is adequate to overcome the friction between their engaging surfaces, and results in plate 17 being cammed or wedged toward the flywheel, thereby providing a self-energizing action. This action not only provides smooth engaging movement of plate 17, but augments the driving pressure applied to plate 17 by the speed-responsive mechanism, and results in a higher final driving pressure than that which would be present if conventional keying means for plate 17 were employed.

Although I prefer to employ an automatic plate driving or keying organization that provides a self-energizing effect, it is to be understood that members 23 may be disposed at greater or smaller angles to provide greater or less degrees of self-energization, or, in fact, they may be replaced by a conventional keying organization without departing from the spirit of the present invention.

When the clutch is slipping and picking up the load, air currents are induced by grooves 37 and 43, formed in flywheel 4 and automatic plate 17 respectively, and in order to augment their air current inducing action, they may be disposed other than radially if desired.

The partial vacuum established by the centrifugal fan action of grooves 37 and 43 causes an air stream to be drawn through the relatively large annular passage between cover 18 and the throwout bearing and along the clutch axis. A part of the axial air stream passes over both faces of plate 25 and between plates 25 and 17, and in this connection, it should be observed that plates 17 and 25 are substantially thermally isolated, and the air currents passing between them effectively prevent the heat that is generated in plate 17, as the result of slipping, from being transmitted to plate 25, and possibly drawing or harmfully modifying the temper of springs 32 and 33 associated with the latter. Another portion of the air stream passes outwardly through grooves 43 located in plate 17, with the cooling and dust-removing action previously explained. A still further portion of the axially moving air stream enters apertures 112, formed in disc 14, and flows outwardly through grooves 37. The heated, dust-laden air is exhausted from the mechanism through openings 41 formed in cover 18, and through the space between the flywheel and cover 18.

The ventilating and dust-removing air may be introduced into, and exhausted from housing 1 in any desired manner, but I preferably contemplate the use of the organizations disclosed in application Serial Number 606,238, filed April 19, 1932, which have proved to be extremely efficient in practice.

When shaft 3 and flywheel 4 attain a predetermined speed, weights 56 rock into contact with the inner wall of cover 18 as seen in Figure 7. In order to stop weights 56 in a definite plane that is normal to the mechanism, and thus insure dynamic balance of the device, stop-edges or faces 113 are accurately formed on weights 56. When the weights have moved into their outermost positions with their stops 113 in contact with cover 18, the plates are disposed in non-slipping engagement and further acceleration of shaft 3 is ineffective to cause a further pressure to be built up between the plates. The plates are thereby held in non-slipping engagement under a predetermined pressure, and a positive friction coupling exists between shafts 3 and 9.

Stop faces 113 are so located on weights 56, with respect to the radius of gyration of weights 56, plus elements 51, 61 and 57, that the radius of gyration at all times is disposed to the left of a plane normal to the clutch axis, and passing through the point of contact of weights 56 with cover 18. By designing the parts in this manner, no matter how great the magnitude of the centrifugal force set up in weights 56 may be, it is incapable of causing clockwise rotative tendencies of the weight illustrated in Figure 7, about face 113 as an axis. On the other hand, if the weight illustrated in Figure 7 had a tendency to rock in a clockwise direction about face 113 as an axis in response to centrifugal force, the mechanism would possibly exhibit declutching tendencies at high speeds.

In view of the resilient nature of the backing means for the reaction member, should certain weights 56 swing further outwardly than the remaining weights, during the engaging operation, the pressure exerted by them is nevertheless uniformly distributed between the segments of plate 17 for the reason that reaction plate 25 can tilt or float, and take a slight angular position with respect to automatic plate 17, due to the fact that the sole movement limiting means of the reaction member is constituted by bolts 27, and the latter are designed to provide sufficient play or clearance to permit this tilting action.

When the automatic engaging operation just described is taking place, reaction plate 25, and its associated parts, are moved to the right of the positions in which they are shown in Figure 1. Movement of reaction plate 25 to the right causes the inner ends of fingers 78 to move from their cooperating engagement with the face of the bearing assembly, thereby relieving the throwout bearing assembly of pressure. The throwout bearing assembly therefore only operates when the clutch is operating at idling speeds or is manually declutched, and it therefore receives only a minimum amount of wear and its life is therefore greatly increased.

With the above described mechanism installed in a motor vehicle provided with a conventional three-speed transmission, and the vehicle is on a substantially level surface, the transmission may be placed in high gear without operating the clutch pedal if the engine is operating below the engaging speed of the clutch mechanism, and the engine may be accelerated to produce automatic clutch engagement in the manner previously described. During the engaging operation, a slipping drive exists between shafts 3 and 9 and the vehicle is accelerated smoothly and without shock and in view of the speed-responsive engaging characteristics of the mechanism, it is impossible to stall the engine through improper actuation of the accelerator. When the engine and vehicle speeds are properly correlated, the clutch plates are brought into full driving engagement, thereby automatically establishing a direct coupling between shafts 3 and 9

When operating in this manner, and it is desired to decelerate or stop the vehicle, the accelerator is released and the brakes are applied. When the vehicle has decelerated to a speed corresponding substantially to engine idling speed, through the combined braking action of the engine and the vehicle brake mechanism, weights 56 rock inwardly under the influence of holdback springs 32 and disengagement of the clutch plates is automatically effected. Shafts 3 and 9 are thereby automatically uncoupled and the braking action of the engine is no longer transmitted to shaft 9, but in view of the fact that the disengaging speed of the clutch mechanism is usually fairly low, the vehicle is decelerated to a relatively low speed under the braking influence of the engine before the mechanism automatically disconnects shaft 3 and 9.

The vehicle may be brought to a complete stop by continued application of the brakes, or, if traffic conditions permit, the accelerator may be depressed and the engine accelerated to produce almost immediate re-engagement of the mechanism and the vehicle again picked up in high gear.

Due to its slipping drive characteristics, the present mechanism constitutes a drive mechanism as well as a clutch, and while it does not multiple the torque delivered from shaft 3 to shaft 9, it permits the engine to operate at a higher speed, and, consequently, at a higher point on its speed-torque curve, and deliver more power, than if substantially non-slipping conditions existed between shafts 3 and 9, and this feature, in combination with the lubricated facings, the novel plate structure, and the self-cooling characteristics of the present mechanism, renders it entirely feasible to operate vehicles in which they are incorporated in high gear under normal conditions.

As previously explained, the latch mechanism is adjusted to hold the parts in the positions shown in Figure 1 of the drawings, when the prime mover is operating at idling speed or is stationary. When the facings have become thin, as the result of particles thereof wearing away during operation, and cause the idle release plate clearance to become too great, the throwout bearing assembly is moved slightly to the right of the position in which it is shown in Figure 1, by adjusting the latch pedal on its shaft, or adjusting the latch mechanism in any suitable manner, in order to dispose automatic plate 17 closer to the flywheel and establish proper plate clearance for idle release conditions. In co-pending application, Serial Number 595,184, filed February 25, 1932, adjusting mechanisms are disclosed that have proved to be highly successful in practice, and I contemplate using these adjusting mechanisms in the present invention. When facing wear has been compensated for several times, by periodically adjusting the throwout bearing assembly further to the right, fingers or levers 78 may be allowed to move to the right to such an extent that, under some conditions, they take undesirable angular positions. This condition is readily remedied, or compensated for, by adjusting nuts 75 an equal amount, and sufficient to bring levers 78 into the proper positions desired. The external adjusting mechanism previously referred to may then be manipulated to establish proper idle release clearance between the plates, and clearance gauges may be introduced between the cover and the flywheel and inserted between facing 15 and the flywheel face to ascertain if the plate clearance is correct. The normal plate wear compensating adjustment, however, is made externally of the clutch housing by adjusting the angular position of shaft 110 into proper automatic position, and therefore this adjustment does not in any way affect the adjusted positions of nuts 75, and consequently, the angular relation of the plates.

On the other hand, if the facings are of such character that they undergo great dimensional changes when wear occurs, spacing members 21 may be removed, and thinner spacers inserted so as to dispose cover 18, automatic plate 17 and reaction plate 25 closer to the flywheel, to thereby established proper idle release clearance, without varying the degree of pressure build-up in springs 33. To facilitate this adjustment, spacer 21 may be made in sections as laminated shims.

*Manual disengaging operation*

When the plates have been automatically brought into full driving engagement in the manner previously described, the clutch pedal may be depressed to displace the throwout bearing assembly and the inner ends of levers 78 to the left of the positions in which they are shown in Figure 1. Movement of levers 78 in this manner causes them to fulcrum about and react against bolts 71 and withdraw the reaction plate from the flywheel. Withdrawal of the reaction plate produces withdrawal or disengagement of automatic plate 17 from the driven member because plates 17 and 25 are held in unitary relation by the holdback assemblies. If the engine speed is maintained above the predetermined engaging speed during the manual declutching operation, weights 56 remain in their outermost positions, as seen in Figure 8; therefore, the declutching operation does not involve retracting the weights against the action of centrifugal force, which, at high speeds might be sufficiently high to preclude affecting the manual declutching operation.

In traffic, when it is desired to get the vehicle away quickly, and in starting up steep grades, the clutch pedal may be operated in this manner to disengage the plates for gear shifting purposes as in a vehicle provided with a manually operable clutch. The clutch pedal may also be operated to produce manual engagement of the plates, (if the engine is operated above the engaging speed of the mechanism) in a manner similar to a manual clutch, for maneuvering the vehicle into and out of parking positions or for navigating in heavy traffic.

*Manual engaging operation*

As has been previously pointed out, when shaft 3 is operating substantially at the idling speed of the prime mover, or is stationary, and the clutch pedal is latched to dispose the throwout bearing in the automatic position shown in Figure 1, a clearance exists between the clutch plates, and shafts 3 and 9 are accordingly disconnected. When it is desired to establish a driving connection between shafts 3 and 9, under these conditions, the latch associated with the clutch pedal is actuated to allow the latter to move into its retracted position. Retraction of the clutch pedal allows the throwout bearing assembly to move to the right under the influence of springs 33, and the latter, acting against the reaction plate, bring reaction plate 25 and automatic plate 17 to the left of the positions in which they are shown in Figure 1, with automatic plate 17 in driving engagement with the driven member, thereby coupling shafts 3 and 9.

With the above described mechanism installed in a motor vehicle, it is frequently desirable to effect this manual engaging operation. For instance, when the motor is cold and the battery is low, it is desirable to place the transmission in gear and push or coast the vehicle to turn the engine over. Also when stopping on a steep grade, positive engagement of the clutch, with the transmission placed in low or reverse gear, provides an emergency brake that cannot be inadvertently released; or if the motor stalls, from lack of fuel or any other cause, the vehicle can pull out of dangerous positions by propelling it in low gear with the starting motor.

In Figures 9, 10, 11, 12 and 13, I have disclosed the mechanism illustrated in Figures 1 to 8, inclusive, provided with a modified form of lever and weight organization. With continued reference to these figures, automatic weights 56a seat directly against enlarged portions 115 of levers 51a.

Figure 13:
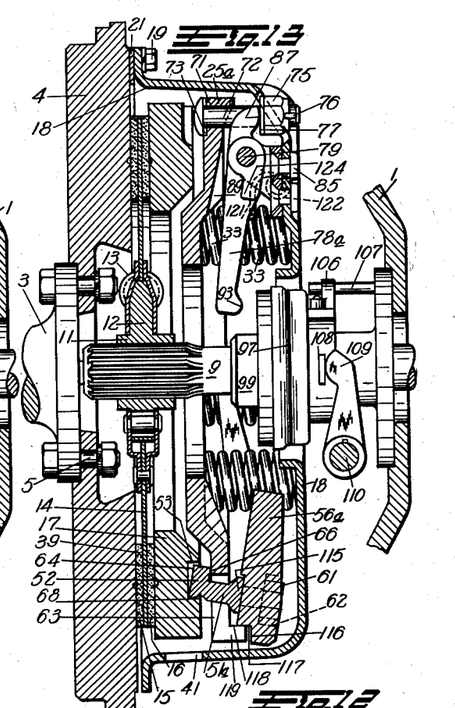
Figure 13 is a view similar to Figure 9, and illustrates the parts in the positions they assume when the clutch mechanism is engaged under the influence of the speed-responsive mechanism.

Weights 56a are provided with angular grooves 116 which form arcuately shaped stop faces 117. Stop faces 117 are adapted to lie in contact with cooperating arcuately shaped faces 118 formed by bosses 119, preferably integrally formed on reaction plate 25a. The positions the parts assume when the weights are disposed in their outermost positions is illustrated in Figure 13. When the weights are in contact with their stops, they exert forces substantially parallel to the face of the automatic plate, thus avoiding setting up distorting tendencies in the latter, and at the same time minimizing the stresses developed in levers 51a. Faces 117 and 118 are accurately machined so that the weights will be stopped with their centers of mass equidistant from the axis of the mechanism, and in a common plane normal to the axis, thereby placing the mechanism in dynamic balance, and insuring smooth, non-vibrating operation at all speeds.

In this form of the invention, light springs 121, each preferably constructed of a single wire, are associated with levers 78a. Each spring 121 consists of two coiled portions 122, interconnected with a straight portion which is looped over the lever with which it is associated. The ends of each spring extend through apertures 123 in cover 18 and are bent over to hold the spring in assembled position.

As previously explained, when the automatic engaging operation is taking place, reaction plate 25a is moved to the right under the influence of the speed-responsive mechanism, and as this produces similar movement of bolts 72 and nuts 75, levers 78a are thereby relieved of all stress. In this form of the invention, springs 121 urge the inner ends of levers 78a to the left, away from the throwout bearing assembly when the automatic engaging operation is taking place (Figure 13). Springs 121, in addition to insuring disengagement of levers 78a from the throwout bearing, when automatic engagement occurs, maintain faces 87 of levers 78a in tight engagement with washers 77 at all times, thereby preventing the parts from rattling.

In order to properly control the action of centrifugal force, upon levers 78a, the latter are provided with preferably integrally formed weight portions 124. Levers 78a are designed so that, when the parts are disposed as shown in Figure 13, the masses thereof are so located with respect to their pivots, that the centrifugal forces set up therein, as the result of rotation of the mechanism, do not exert substantial rotative influences in the levers. When the parts are disposed in automatic idling position, (Figure 9) the greater portion of the masses of levers 78a, is located to the right of their pivots, but this is not a disadvantage, however, because the parts only assume these positions when the mechanism is rotating at low speeds, and the centrifugal forces existing under these conditions are likewise of low magnitude.

Figure 12:
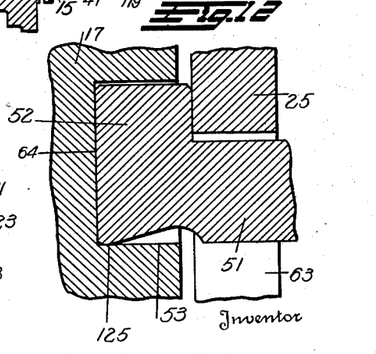
Figure 12 is an enlarged sectional view of the centrifugally operable lever shown in Figure 9, and particularly illustrates the cooperation of the latter with the automatic plate.

Referring now to Figure 12, weight heads 52, instead of having knife edges formed thereon are provided with rounded portions 125, which are adapted to cooperate with a rolling action on the outer walls of recesses 53 when levers 51 fulcrum outwardly in response to centrifugal force. Constructing the weight heads in this manner avoids localizing pressures in relatively thin, knife-like edges, and enables the levers to operate with a minimum of friction.

Referring to Figure 13, the clutch is illustrated as automatically engaged under the influence of the automatic weights, and the inner end of the lever disclosed is shown as spaced a substantial distance from the throwout assembly. The latter is brought about through movement of reaction plate 25a to the right, and the levers are held in this position under the influence of springs 121 so long as the clutch is in full automatic engagement. Weight portions 124 are so related with levers 78ª that, when the levers are disposed in the position shown in Figure 13, the centrifugal forces set up in them, each side of a plane normal to the axis of the mechanism and passing through their axes, are approximately equal, so that they will not undergo rotative tendencies. If levers 78a, in response to centrifugal force, exhibited tendencies to rotate so as to move their inner ends to the left, (Figure 13) the levers would transmit declutching forces to the reaction plate. However, if the levers should be designed so that they tended to rotate and bring their inner ends toward the throwout assembly in response to centrifugal forces set up therein, their movement is ineffective to modify the plate pressure established by the action of weights 56, because their faces 87 of levers 78a would merely move away from washers 77, against the action of springs 121. Therefore, the prime requisite is that the levers, in response to centrifugal force, will not exhibit tendencies to move in such manner as to bring their inner ends away from the throwout assembly when the clutch mechanism is automatically engaged.

Figures 14, 15, 16, 17, 17A:
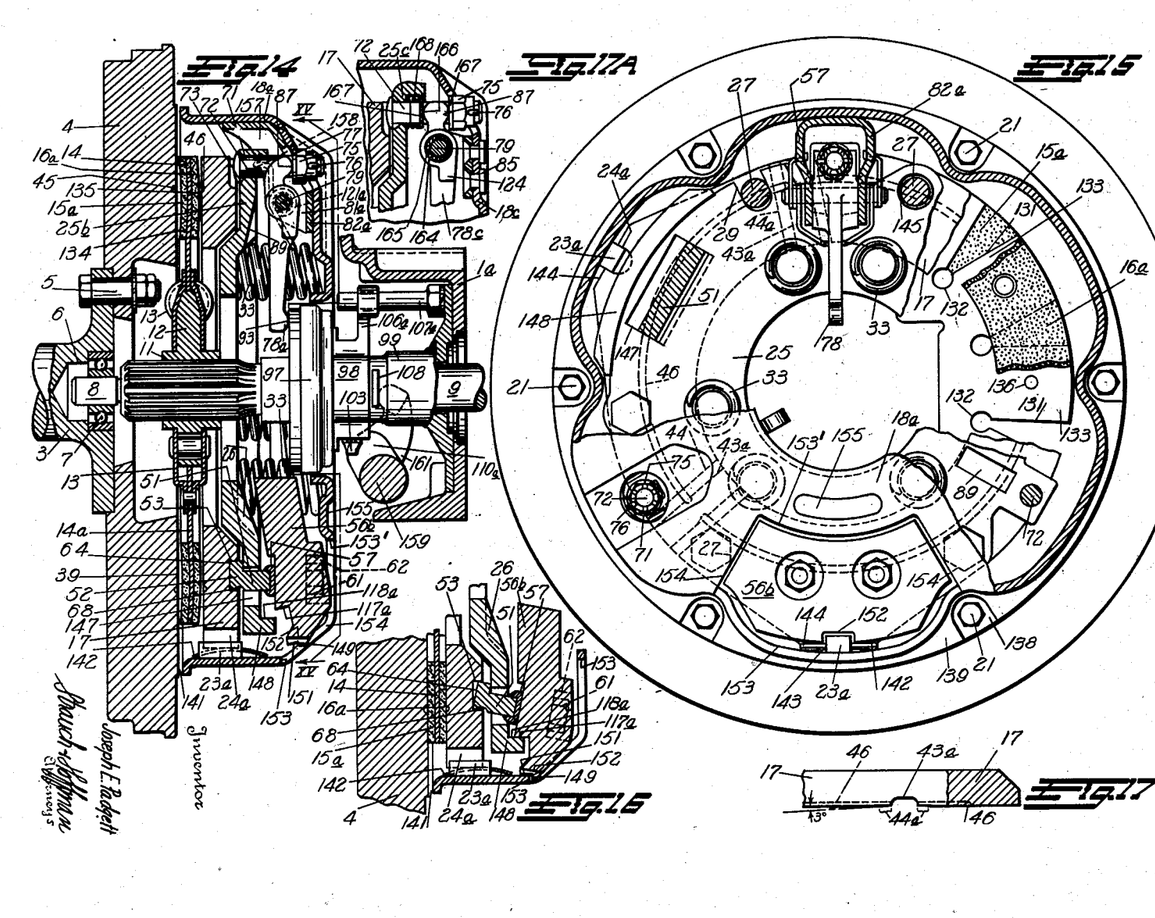

In Figures 14, 15 and 16, I have illustrated a further modification of my invention. In this form of my invention, many of the parts are identical in structure and function to corresponding parts of the clutch mechanism illustrated in Figures 9 to 13, inclusive, and the description thereof will accordingly not be repeated.

With continued reference to these figures, driven disc 14a is provided with recesses having straight walls 131. Walls 131 are contiguous at their inner ends with circular recesses 132. The portions of disc 14a, intermediate the recesses, define flexible fingers or spokes 133. Fingers 133 are designed or bowed, so that when the clutch is disengaged, as shown in Figure 14, they present an annular convex face 134 and an annular concave face 135. The extent to which fingers 133 are bowed in Figure 14 is exaggerated in order to more clearly bring out the nature of the structure involved.

Facings 15a and 16a are preferably formed so as to have a configuration similar to fingers 133, and are preferably secured to the latter by means of rivets extending through apertures 136 located in fingers 133. Fingers 133 and facings 15a and 16a are designed to flex as a unit when they are frictionally gripped between the automatic plate and the flywheel, so that as pressure builds up, the area of the flywheel and the automatic plate, contacted by facings 15a and 16a, respectively, progressively increases, until, when the full driving pressure is applied to the plates, facings 15a and 16a flatten out into full engagement with the flywheel and the automatic plate. The latter condition is illustrated in Figure 16.

The driven assembly just described, in combination with the automatic clutch mechanism herein disclosed, provides an extremely soft initial clutch engagement and insures a smooth pick up of the driven member under all operating conditions encountered in practice. I have also discovered that, by employing this driven assembly in combination with the grooved flywheel and automatic plate organization disclosed, an extremely practical mechanism is obtained, which not only has highly desirable operating characteristics, but also stands up well in use, even under severe operating conditions, because the degree to which fingers 133 are bowed may be less than that employed in prior so-called cushion disc organizations, with the result that the extent to which fingers 133 and facings 15a and 16a flex during operation may be reduced.

In this form of my invention, cover 18a is provided with embossed portions 138 which are pressed out of the plane of flange 139, and are adapted to be held in contact with flywheel 4 by means of cap screws 21. Referring to Figure 14, portions 138 serve to space cover 18a from the flywheel to provide a clearance space 141, and the latter is utilized for adjustment and ventilation as in the previously described clutch mechanisms.

Driving lugs 23a are preferably spot welded to the inner wall of cover 18a, and the driving faces thereof are shown as being disposed substantially parallel to the axis of the mechanism but it is to be understood, however, that lugs 23a may be inclined to the axis, to provide any desired degree of self-energization, as disclosed in the previously described modifications of my invention, if desired. Recesses 24a, with which lugs 23a cooperate, are formed in automatic plate 17 substantially radially outwardly of the weight assemblies, and cooperate with the segments of the automatic plate in a slightly different manner than those employed in the modification of my invention that have been previously described.

Referring more particularly to Figures 15 and 17 of the drawings, grooves 43a are not as deep as grooves 43, and levers 51 apply pressure substantially centrally of the segments defined by grooves 43a. In this form of my invention, the surface of plate 17, adjacent grooves 43a, is provided with flat faces 44a, that are disposed at an angle of approximately three degrees to the face of plate 17, and the corners produced by forming these faces are polished and rounded so that they will not exert an abrading or scoring action on the facings. By designing the plate in this manner, the latter, when it is forced into frictional engagement with the driven member, in fact, exerts a smoothing action upon the facings carried thereby.

Lugs 23a are preferably three in number and recesses 24a, with which they cooperate, are designed so that when the parts are assembled, a thickness or "feeler" gauge, having a thickness varying from approximately 0.0015 inch to 0.05 inch, depending upon the size of the clutch, and other factors, may be inserted between lugs 23a and the walls of recesses 24a. This clearance is necessary to permit free axial, and possibly slight tilting movements of the automatic plate during normal operation.

The clearance existing at the driving lug assemblies necessarily permits the automatic plate to shift slightly radially, and as automatic plate 17 is of considerable mass, and the elements mounted upon it are also of considerable mass, radial movement of the automatic plate unbalances the mechanism statically as well as dynamically. In the particular clutch mechanism disclosed, a radial or sidewise movement of four thousandths of an inch represents two inch-ounces tending to unbalance the mechanism.

In order to eliminate this difficulty, the parts are so designed, that the mechanism is in static and dynamic balance when the automatic plate is located on one side of the mechanism, i. e., with the walls of recesses 24a in close contact with two of the driving lugs 23a, and means are provided for maintaining the parts in this condition at all times. In the present mechanism, this means takes the form of a leaf spring 142. Referring to Figures 14 and 15, spring 142 is preferably provided with an aperture 143, and fits over, and is held in place by one of the driving lugs 23a.

Spring 142, in the particular clutch mechanism illustrated, preferably exerts a force of approximately thirty pounds, and is designed to urge the automatic plate toward the other lug assemblies and serves to take up the "play" or lost motion therein. Referring to Figure 15, spring 142 acts against and applies pressure to flat portions 144 of plate 17, located either side of recesses 24a.

Spring 142 accordingly maintains the parts in balanced condition at all times, and yet, in view of its resilient nature, does not interfere with free axial, and even slight tilting, movements of automatic plate 17. Although I prefer to employ a spring of the type disclosed for holding the parts in balanced condition, it is to be understood that a tension or compression spring, or any other suitable means, may be employed to produce this result, without departing from the spirit of the present invention. I also contemplate the use of the balancing means just described in the clutch mechanisms illustrated in Figures 1 to 13, inclusive, if desired.

In this form of my invention, three symmetrically spaced holdback spring bolts 27 fit rather snugly in recesses 29 formed in reaction plate 25b, thus accurately centralizing reaction plate 25b with respect to automatic plate 17. The remaining three holdback bolts extend loosely through apertures 145 located in plate 25b and therefore do not operate to assist in centralizing the latter. By constructing the mechanism in this manner, plate 25b is maintained in balanced condition at all times, and yet a minimum of accurate machining operations are required to manufacture the mechanism because it is only necessary that recesses 29 be accurately located in plate 25b for proper operation.

Reaction plate 25b is provided with three apertures 147, through which levers 51 extend, and are preferably of sufficient size to permit the levers to be withdrawn from the mechanism when the automatic and reaction plates are separated.

Bosses 148 are provided on reaction plate and are machined to provide arcuate stop faces 118a that cooperate with stop faces 117a of weights 56b in the manner described in connection with the mechanism illustrated in Figures 9 to 13, inclusive. Weights 56b are also provided with angular grooves 149 which define arcuate stop faces 151, and also have recesses 152 formed therein, which allow the weights to freely rock without interference with the clutch parts.

Reaction plate 25b is comparatively rigid, and the stops provided thereon are therefore adequate to stop or restrain weights 56b against movement outwardly further than the position shown in Figure 16, with their stop faces 151 spaced from cover 18a, under normal operating conditions. However, should any of the elements give way or break, through abuse of the mechanism, or the mechanism be accelerated to an excessive speed, (racing the engine with the transmission in neutral, etc.) weights 56b may rock further outwardly and bring their stop faces 151 into contact with the inner wall of cover 18, thereby preventing the mechanism from being damaged.

Weights 56b are designed to exert more force than those disclosed in Figures 9 to 13, inclusive, and they are therefore of larger size. In order to allow these weights to rock properly within a standard size cover, cover 18a is preferably cut away in the region of the weights to provide apertures having inner walls 153', outer walls 153 and side walls 154. If desired, however, cover 18a may be embossed to provide recesses for accommodating the weights. The manner in which the weights cooperate with the cover apertures is clearly illustrated in Figure 16.

In order to compensate for the weakening effect of removing the material from the cover through the aperture forming process, and stiffen the structure, indentations 155 are formed in cover 18a adjacent the apertures in the latter.

Cover 18a is also reinforced against flexing, under the influence of springs 33, by means of saddles or bracket members 82a which are provided with portions that engage the cylindrical portion of cover 18a and are preferably secured to the latter by a spot-welding operation. Saddles 82a are also provided with webs 157 which are integrally formed with their ear portions 81a, and reinforce the saddles against distortion in response to stresses set up in cover 18a.

In this modification of the invention, springs 121a are preferably looped over levers 78a, and are coiled around lever pins 79, and have bent portions 158 adjacent their free ends which are hooked over webs 157 of saddles 82a.

The throwout mechanism in this form of my invention is generally similar to that employed in the clutch mechanisms previously described, but throwout shaft 110a is made in two sections and is located closer to the axis of the mechanism and its sections are connected together for unitary movement by means of a yoke member 159. Fingers 161 are formed on yoke member 159 and cooperate with lugs 108 carried by throwout sleeve 98.

Lubricant fitting 183 is located on the under side of sleeve 98, in order to render it accessible from the bottom of the mechanism, and lug 106a carried by the latter is enlarged in the region where it cooperates with stud member 107a, for the purpose of strengthening it and also reducing the wear involved. Stud 107a is provided with a flat sided portion that enables the latter to be manipulated by a wrench or other tool. Throwout bearing support 99 may be integrally formed with housing 1a, which is of slightly modified construction, but in the present instance, it is disclosed as being detachably secured to housing 1a in a manner similar to that described in connection with the first forms of my clutch mechanism.

Although I have disclosed, and prefer to employ clutch mechanisms of the "single plate" type, i. e., clutch mechanisms having two driving members and a single driven member, it is to be distinctly understood that my invention contemplates clutch mechanisms wherein three or more driving members cooperate with two or more driven members to effect a driving connection between the driving and driven shafts, and the appended claims are intended to embrace clutch mechanisms of this character.

It is also to be understood that, although I have illustrated the present embodiments of my invention incorporated in automatic clutch mechanism, my novel plate and flywheel organization may be advantageously employed in a wholly manually operable clutch by applying the pressure exerted by the driving springs to substantially localized areas of the trailing ends of the pressure plate segments, by means of levers or the like, and the appended claims are intended to embrace clutch mechanisms of this character.

In Figure 17A of the drawings, I have illustrated a modified form of plate and lever organization that may be used in any of the previously described clutch mechanisms. Reaction plate 25c is preferably hot-stamped from comparatively heavy gauge sheet metal, and is hardened to give it good wearing properties.

Levers 78c are provided with comparatively large openings 164, and a plurality of roller bearings 165 are interposed between them and their shafts 79 for the purpose of minimizing the operating friction involved. Levers 78c are also provided with curved faces 166, which cooperate with washers 167 located on bolts 72. Comparatively light compression springs 168 encircle bolts 72 and react against reaction plate 25c and hold washers 167 in contact with faces 166 of levers 78c at all times, and are preferably of sufficient strength to hold levers 78c in contact with washers 77 during all phases of operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. In a clutch mechanism, a driving shaft; a driving member; a driven member; means for forcing said members into frictional engagement; means for establishing contact pressure regions between the surfaces of said members when the latter are brought into engagement; and means for establishing a driving connection between said driving shaft and said driving member, said last named means being so associated with said driving member that said pressure areas are located in said driving member in trailing relationship to said contact pressure regions.

2. In a clutch mechanism, a driving shaft; a driving member; a driven member; means for forcing said members into frictional engagement; means dividing said driving member into a plurality of segments, and means for causing said driving shaft to drive said driving member; said last named means being so designed that when said members are brought into frictional engagement, the torque reaction imposed upon said driving member sets up substantially purely tensional forces in the segments of said driving member.

3. The clutch mechanism set forth in claim 2, wherein said forces are applied to said segments circularly remote from said driving means.

4. In a clutch, a flywheel having a substantially plane face disposed normal to the axis thereof, a driven shaft disposed in alignment in said flywheel and having a frictional disc thereon, a clutch cover of generally cup shape having a cylindrical portion and a portion of disc shape secured to said flywheel and having a central aperture therein adjacent the axis of said flywheel through which said driven shaft extends; a driving plate disposed in said cover and having means for causing it to advance and frictionally grip said driven disc betwen it and the plane face of said flywheel, said cover terminating in a circular lip which is spaced from the plane face of said flywheel to define a substantially continuous annular passage, whereby cooling air currents may enter the aperture in said cover, flow over and cool said disc and plate and be exhausted from the cover by way of said annular passage.

5. The clutch described in claim 4, wherein said cover terminates in a flanged circular portion which is spaced from the plane face of said flywheel and is disposed substantially radially opposite the outer periphery of said driven disc.

6. The clutch described in claim 4, wherein said driving plate and driven disc are provided with means for causing said cooling air currents to flow over the frictionally engaging faces thereof when they are engaged.

7. In a clutch, in sub-combination a flywheel having a substantially plane surface disposed normal to its axis and extending to the outer periphery of said flywheel, said plane surface being adapted to cooperate with a driven disc, a substantially cup-shaped cover disposed with its open side toward said flywheel, and means for securing circularly spaced portions of said cover to the plane surface of said flywheel, to space said cover from said flywheel and thereby define a substantially unobstructed cooling air passage between the edge of said cover and the plane surface of said flywheel.

8. In a clutch, in sub-combination, a driving member mounted for rotation and having a frictional face disposed normal to its axis, a driven member mounted for engagement with the frictional face of said driving member, said driven member comprising a disc having at least one facing secured thereto by a plurality of circularly spaced fastening devices located intermediate its inner and outer peripheries, said fastening devices cooperating with countersinks in said facing, said driving member having a circular groove in the frictional face thereof and communicating with each of said countersinks.

9. The clutch described in claim 8, wherein the axis of said circular groove is offset with respect to the axis of said driving member.

10. The clutch described in claim 8, wherein the width of said groove is considerably less than the diameter of said countersinks and said groove is so placed in said driving member that a part of said groove will traverse the entire width of said countersinks upon each revolution of said members with respect to each other.

11. The clutch described in claim 8, wherein said driving member is also provided with a plurality of substantially radially extending grooves which intersect said circular groove.

12. In a clutch mechanism of the dry plate type, a frictional driving member and a frictional driven member mounted for engagement and disengagement, one of said members having a frictional facing provided thereon, and the other of said members having a plurality of outwardly extending grooves provided therein, means for forcing said members into driving engagement with said facing gripped therebetween, said grooves providing passages through which cooling air currents may progressively sweep over the entire working surfaces of said facing when said driving and driven members are slipping relative to each other.

13. The clutch mechanism described in claim 12, wherein said other member is provided with at least one substantially circular groove which intersects said first named grooves.

JOSEPH E. PADGETT.